US009007745B1

(12) United States Patent
Flegel

(10) Patent No.: US 9,007,745 B1
(45) Date of Patent: Apr. 14, 2015

(54) CONFIGURABLE ELECTRICAL LOAD CENTER

(75) Inventor: Michael O. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 282 days.

(21) Appl. No.: 13/612,296

(22) Filed: Sep. 12, 2012

(51) Int. Cl.
*H02B 1/26* (2006.01)
*H02B 1/16* (2006.01)

(52) U.S. Cl.
CPC ............................... *H02B 1/16* (2013.01)

(58) Field of Classification Search
USPC ......... 361/627, 633–634, 641, 644, 650, 652, 361/655, 656
See application file for complete search history.

(56) References Cited

U.S. PATENT DOCUMENTS

| | | | |
|---|---|---|---|
| 2,967,287 A * | 1/1961 | Sori | 439/724 |
| 4,167,769 A * | 9/1979 | Luke et al. | 361/637 |
| 4,231,633 A * | 11/1980 | Luke et al. | 439/723 |
| 4,785,377 A * | 11/1988 | Rhodes | 361/637 |
| 5,805,414 A * | 9/1998 | Feldhaeusser | 361/637 |
| 7,209,343 B2 * | 4/2007 | Remmert et al. | 361/634 |
| 7,238,898 B1 | 7/2007 | Czarnecki | |
| 7,449,645 B1 | 11/2008 | Flegel | |
| 7,462,791 B1 | 12/2008 | Flegel | |
| 7,531,762 B2 | 5/2009 | Flegel | |
| 7,599,171 B1 * | 10/2009 | Remmert | 361/631 |
| 7,602,083 B1 | 10/2009 | Flegel et al. | |
| 7,772,723 B1 | 8/2010 | Flegel | |
| 7,834,282 B2 | 11/2010 | Flegel | |
| 7,834,486 B1 | 11/2010 | Flegel et al. | |
| 7,864,509 B1 * | 1/2011 | Remmert | 361/631 |
| 7,888,821 B2 | 2/2011 | Flegel et al. | |
| 7,909,642 B1 | 3/2011 | Czarnecki et al. | |
| 8,098,465 B1 | 1/2012 | Flegel | |
| 8,110,759 B2 | 2/2012 | Flegel | |
| 8,810,081 B1 * | 8/2014 | Flegel et al. | 307/328 |
| 2010/0187075 A1 * | 7/2010 | Flegel | 200/50.32 |

* cited by examiner

*Primary Examiner* — Robert J Hoffberg
(74) *Attorney, Agent, or Firm* — Boyle Fredrickson, S.C.

(57) ABSTRACT

A configurable electrical panel that may be installed either as a service entrance panel or as a subpanel is disclosed. The electrical panel includes a transfer switch for selectively connecting either a first power source or a second power source to an electrical load, where the transfer switch switches the power leads and the neutral lead from each power source. In a service entrance panel installation, the neutral lead from the first power source is connected to the ground bar and an electrical conductor is provided to connect the ground bar to the neutral input on the transfer switch for the first power source. In a sub-panel installation, the neutral lead from the first power source is connected directly to the neutral input on the transfer switch for the first power source.

4 Claims, 3 Drawing Sheets

CONFIGURABLE ELECTRICAL LOAD CENTER

BACKGROUND OF THE INVENTION

The present invention relates generally to electrical panels and, more particularly, to an electrical panel that is configurable to be installed as a service entrance panel or a subpanel.

Electrical panels, breaker boxes, or load centers frequently include a main contactor, switch, or breaker, which electrically isolates a series of load breakers from a utility power input. In the typical utility power input installation, the main contactor selectively connects or disconnects a first hot lead, L1, and a second hot lead, L2, with a respective bus bar, to which the subsequent load breakers are connected. A neutral lead, N, is connected to a neutral bar from which neutral connections are distributed to each of the loads. In addition, a ground connection is established in the load center, for example, by a ground bar connected to a conductive rod inserted into the ground or to a metal wire pipe exiting the site into the ground. The ground bar provides connection points for ground conductors to be distributed to the loads as required. According to wiring standards, the neutral lead, N, from the utility power is connected to the ground connection at a single location within the load center. Thus, in a standard installation a bonding wire may be connected between the neutral bar and the ground bar.

Occasionally, such load centers are configured to receive a secondary input power source, such as from a generator, to provide electrical power to the individual loads in the event of a utility power failure. During interruption of utility power, the generator supplies power to the load center, which the load center distributes to selected circuits of the building. Depending on factors such as the size of the generator, the number of electrical loads, and whether a load is considered critical (i.e., must remain on during a utility power outage), such as a furnace, sump pump, etc., the secondary power source may power all of the electrical loads or only a portion of the loads.

Similar to the utility power input, the generator includes a first hot lead, L1, a second hot lead, L2, and a neutral lead, N. Further, the generator may be separately derived or non-separately derived. In a non-separately derived system, the neutral connection from the generator is not connected to an earth ground and is, therefore, bonded with the neutral connection from the utility supply. A single connection between the neutrals and grounds is established in the service entrance panel, typically between the neutral bar and the ground bar. In a separately derived system, the neutral connection from the generator is connected to a ground at the generator. Because the electrical system may only be connected between neutral and ground at a single point, extra steps must be taken to properly integrate a separately derived generator with utility power. The neutral leads, N, of the utility power and the secondary source must be switched by the transfer switch in addition to the hot leads. Further, the connection between neutral and ground for the utility system must occur prior to the switched connection such that it is removed when the secondary power source is connected and the equipment grounds for the loads are separated from the neutral. Typically the neutral bar and the ground bar are not connected directly in a service entrance panel but rather they are combined into one dual-function terminal bar. This separation is needed in a service entrance transfer panel to keep the neutrals and ground wires separate when switched to the secondary power source as the connection between neutral and ground takes place further upstream towards the power source and cannot occur again in the panel.

A transfer switch is provided to selectively connect the leads from either the utility power source or the secondary power source to the electrical loads. Depending on the application requirements, the transfer switch may be installed directly in the service entrance panel, which is the point of entry for the utility power, or in a separate subpanel. If the transfer switch is in a subpanel, electrical conductors are run from the service to the subpanel to establish an electrical connection with the utility power within the subpanel. In either case, the connection between the utility neutral and ground is established in the service entrance panel. When the transfer switch is in the service entrance panel, the connection must be established prior to the utility neutral lead entering the transfer switch. When the transfer switch is in the sub panel, no ground connection may be made with the utility neutral lead. Despite the different connection requirements, it is desirable to provide a single electrical panel that may be used either in the service entrance panel or in the subpanel.

SUMMARY OF THE INVENTION

The present invention is directed to a configurable electrical panel that may be installed either as a service panel or as a subpanel. The electrical panel includes a transfer switch for selectively connecting either a first power source or a second power source to an electrical load, where the transfer switch is operable to switch the power leads and the neutral lead from each power source. In a service panel installation, the neutral lead from the first power source is connected to the ground bar and an electrical conductor is provided to connect the ground bar to the neutral input on the transfer switch for the first power source. Thus, when the transfer switch is connecting the utility power to the load, the neutral bar is electrically connected to the ground bar. In a sub-panel installation, the neutral lead from the first power source is connected directly to the neutral input on the transfer switch for the first power source. Thus, the neutral bar remains electrically isolated from the ground bar in the subpanel.

According to one embodiment of the invention, an electrical load center configured to distribute power from multiple power sources to a plurality of electrical loads is disclosed, where each power source has a neutral conductor. The electrical load center includes a neutral terminal bar and a ground terminal bar. Each of the neutral terminal bar and the ground terminal bar has a plurality of terminals and is configured to provide a neutral connection or ground connection, respectively, to the plurality of electrical loads. The ground terminal bar can also be configured to receive a conductor connected to an electrical ground. The electrical load center also includes a transfer switch assembly that has a first input configured to receive the neutral conductor from a first power source, a second input configured to receive the neutral conductor from a second power source, and an output electrically connected to a neutral terminal bar. The transfer switch assembly is operable in a first position to connect the first input to the output and operable in a second position to connect the second input to the output. The electrical load center also includes a first connector mounted to the first input of the transfer switch assembly and configured to receive the neutral conductor from the first power source, a second connector mounted to the ground terminal bar and configured to receive the neutral conductor from the first power source, a third connector mounted to the ground terminal bar, and an electrical conductor removably connected between the first connector and the third connector. Each of the first, second, and third connectors may be a terminal block having an opening configured to receive the neutral conductor and a clamping member to secure the neutral conductor within the opening.

According to another embodiment of the invention, an electrical distribution panel is configured to mount within an enclosure and to distribute power from multiple power sources to a plurality of electrical loads, where each power source has a neutral conductor. The electrical distribution panel includes a neutral terminal bar mounted to the electrical distribution panel, a ground terminal bar mounted within the enclosure and configured to receive a conductor or otherwise be connected to an electrical ground, a transfer switch, and means for selectively configuring the electrical distribution panel as one of a service entrance panel and a sub panel. The transfer switch includes a first input configured to receive the neutral conductor from a first power source, a second input configured to receive the neutral conductor from a second power source, and an output selectively connected to one of the first input and the second input.

According to still another embodiment of the invention, a method of configuring an electrical load center as a subpanel in a first operating configuration and a service entrance panel in a second operating configuration is disclosed. The electrical load center includes a transfer switch configured to distribute power from a first power source and a second power source to a plurality of electrical loads, where each power source has a neutral conductor. The neutral lead is connected from the first power source to a first connector in the first operating configuration and to a second connector in the second operating configuration. The first connector is mounted to a first input of the transfer switch, and the second connector is mounted to a ground terminal bar. The ground terminal bar has a plurality of terminals and is configured to receive a conductor connected to an electrical ground. An electrical conductor is connected between the first connector and a third connector, mounted to the ground terminal bar, in the second operating configuration.

Various other features, objects and advantages of the present invention will be made apparent from the following detailed description of the drawing figures.

BRIEF DESCRIPTION OF THE DRAWINGS

Various exemplary embodiments of the subject matter disclosed herein are illustrated in the accompanying drawings in which like reference numerals represent like parts throughout, and in which.

DETAILED DESCRIPTION OF THE PREFERRED EMBODIMENT

The various features and advantageous details of the subject matter disclosed herein are explained more fully with reference to the non-limiting embodiments described in detail in the following description.

Figure 1:
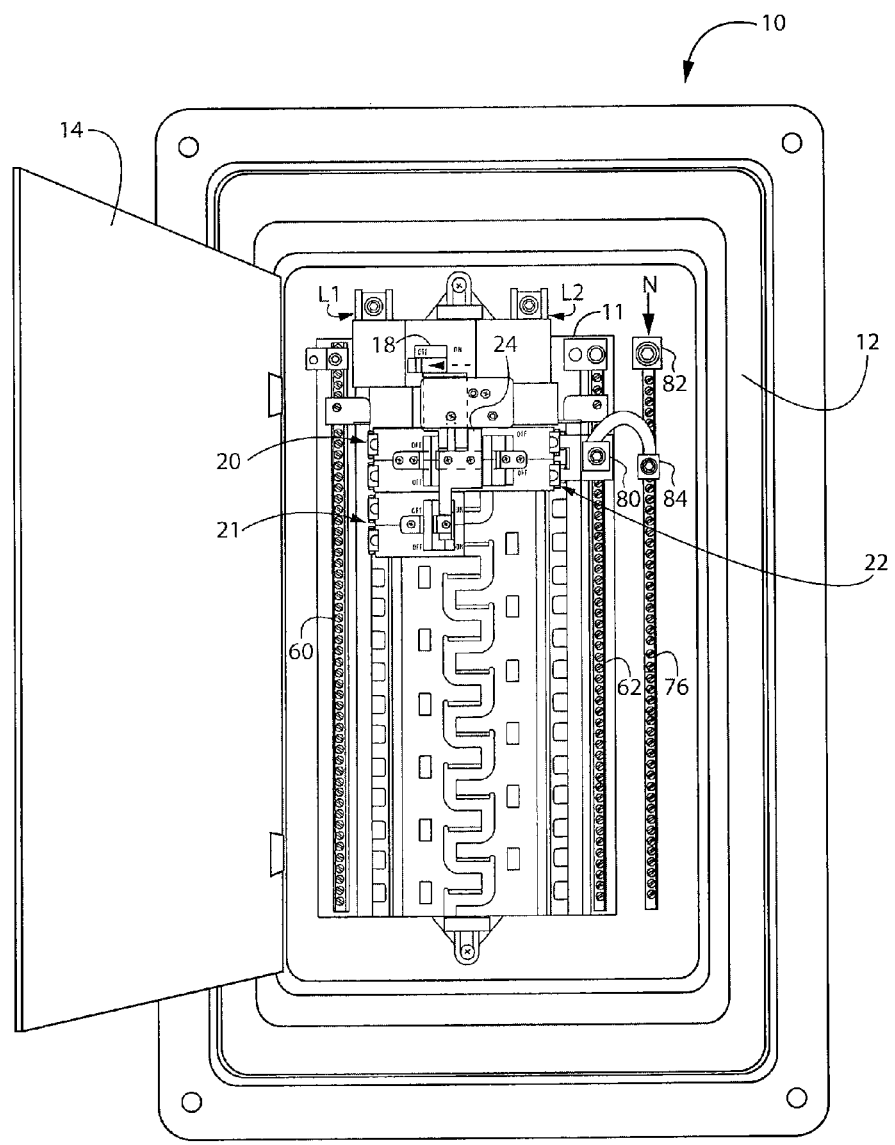
FIG. 1 is a perspective view of an exemplary load center having one embodiment of an electrical panel according to the present invention.

Referring first to FIG. 1, a load center 10, according to one embodiment of the present invention, is configured to supply power to a series of electrical circuits from one of at least two power sources. Representatively, load center 10 controls the supply of power to the electrical circuits from a primary power supply, such as utility power, and an alternate or secondary power source which is adapted to supply power in the event power from the primary power supply is unavailable. Typically, the alternate or secondary power source is an electrical generator, although it is understood that any other source of secondary or alternate power may be employed. The following description utilizes terminology which makes reference in various instances to a generator, and it is understood that such terminology is used for the sake the convenience and that the term "generator" is meant to encompass any secondary or alternate power source, and is not limited to a generator as the alternate power source.

The load center 10 includes an enclosure 12 having a door 14 pivotally connected to selectively cover a central portion of the enclosure 12. An electrical panel 11 is mounted within the enclosure 10 and is configured to receive load breakers. A main switch 18 passes through the central portion of the enclosure 12 and is constructed to receive the utility power connection. A generator neutral switch 20, generator switch 21, and a utility neutral switch 22 are configured to be inserted into the electrical panel 11. The generator neutral switch 20 is configured to receive the generator neutral connection, the generator switch 21 is configured to receive the generator power connection, and the utility neutral switch 22 is configured to receive the utility neutral connection. An interlock assembly 24 is mounted to one or more of the main switch 18, generator switch 21, generator neutral switch 20, and utility neutral switch 22. The interlock assembly 24 is configured to prevent an inadvertent concurrent connection of the utility power input via main switch 18 and generator power input via generator switch 21 to loads connected to the load center 10. The interlock assembly 24 also controls the movement of neutral switches 20 and 22 relative to main switch 18 and generator switch 21, to ensure that the switches are actuated in the correct sequence. Although the transfer switch assembly is illustrated as multiple switches with an interlock assembly 24, it is further contemplated that various other configurations may be employed without deviating from the scope of the invention, such as a single transfer switch configured to transfer each of the hot leads and the neutral leads for both power sources.

Figure 2:
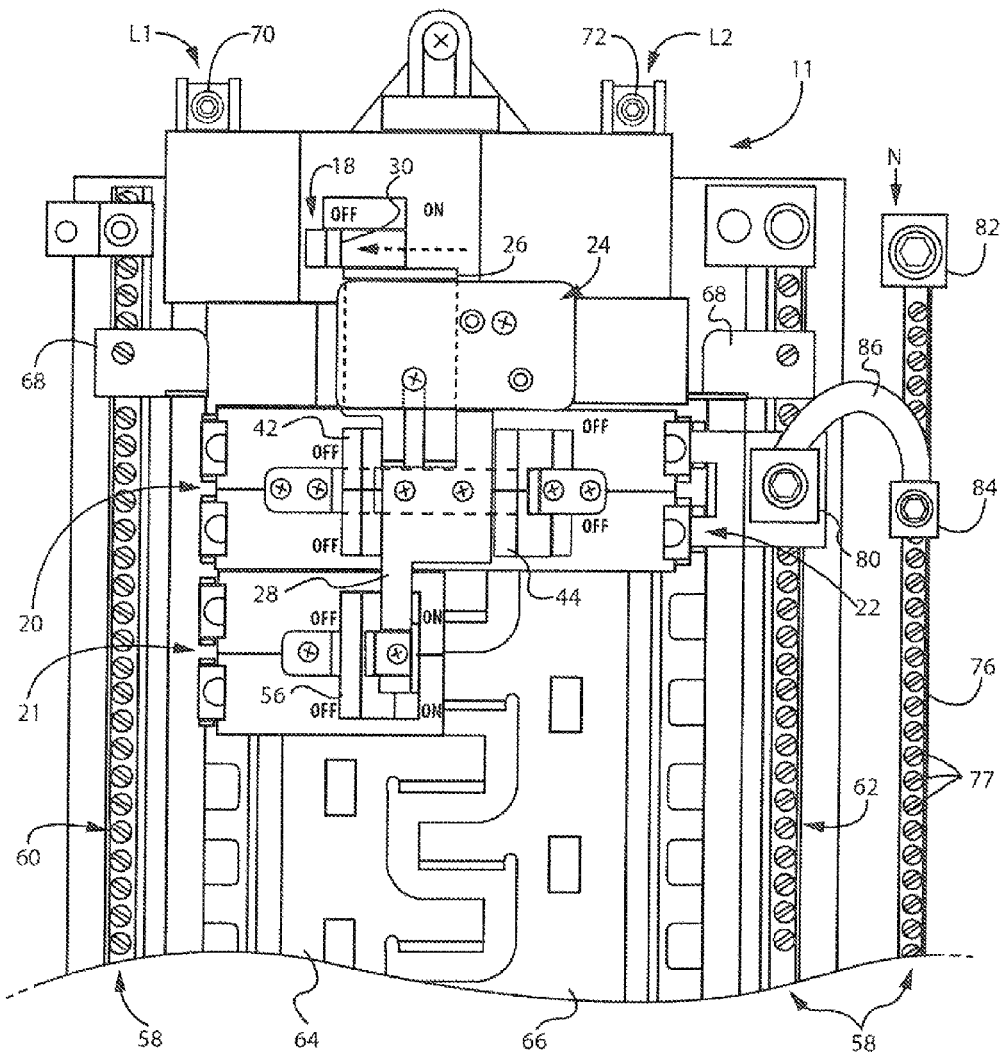
FIG. 2 is an elevational view of the load center shown in FIG. 1 with the electrical panel configured as a service entrance panel.
Figure 3:
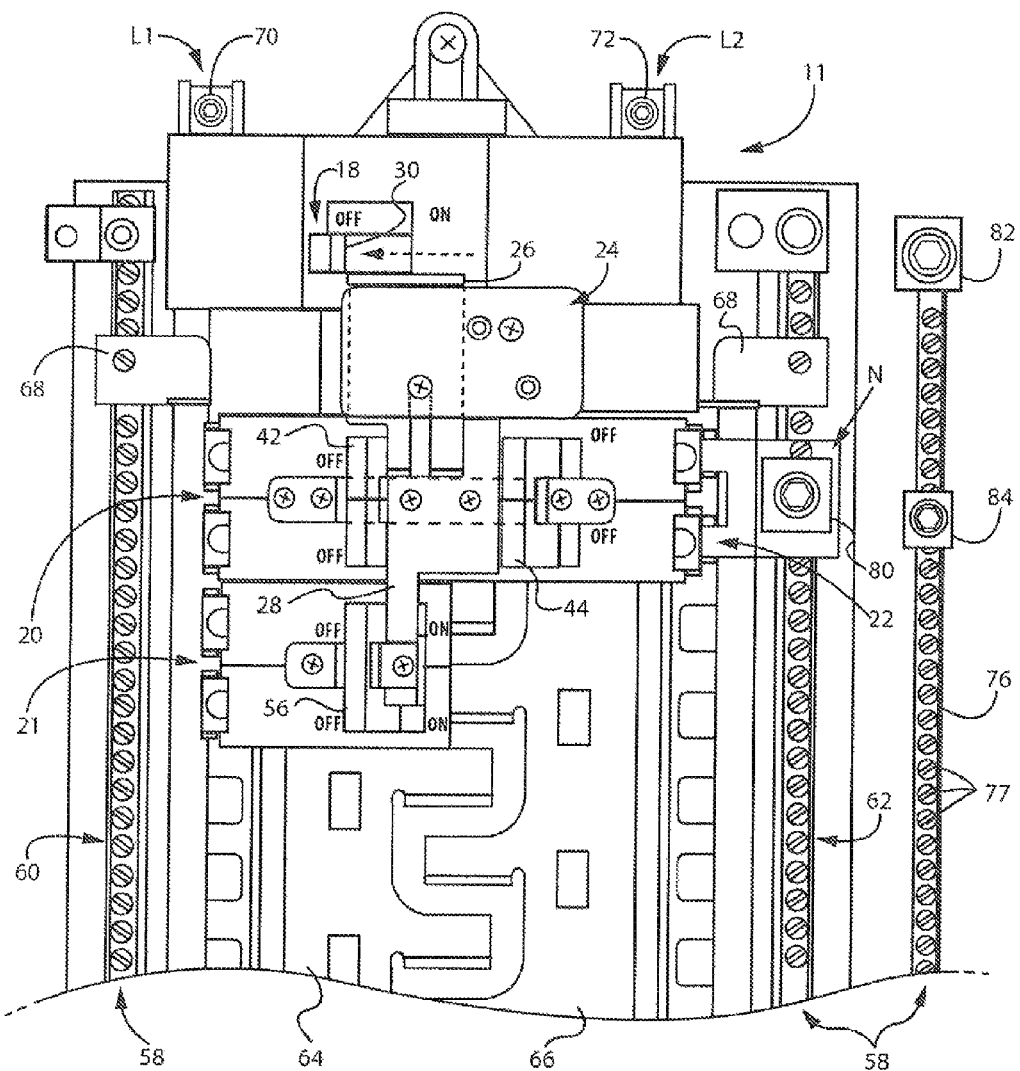
FIG. 3 is an elevational view of the load center shown in FIG. 1 with the electrical panel configured as a sub-panel.

Referring next to FIGS. 2 and 3, a portion of the electrical panel 11 is illustrated. The electrical panel 11 includes a series of terminal bars 58. The terminal bars 58 include a first neutral bar 60, a second neutral bar 62, a first hot lead terminal bar 64, and a second hot lead terminal bar 66. An additional terminal bar 58 is mounted within the enclosure 12, typically adjacent to the electrical panel 11, for connection to an electrical ground and, consequently, is also referred to as the ground bar 76. A neutral connector plate 68 extends behind the interlock assembly 24 and electrically connects the first neutral bar 60 to the second neutral bar 62. The generator neutral switch 20 and the utility neutral switch 22 are each electrically connected to the neutral connector plate 68. The generator switch 21 is electrically connected to the first and the second hot lead terminal bars 64 and 66, respectively. The main switch 18 includes a first input terminal 70 and a second input terminal 72. Each of the first and second input terminals 70, 72 are configured to receive one of the hot leads, L1 or L2, from the utility power input provided to the load center 10.

The switch handle 30 of the main switch 18 is movable between a first position, ON, and a second position, OFF, to selectively connect the hot leads from the utility power to the first and the second hot lead terminal bars 64 and 66, respectively. When the switch handle 30 of the main switch 18 is in the ON position, the utility power supplied to input terminals 70 and 72 is conducted through the main switch 18 to the first and second hot lead terminal bars 64 and 66, respectively. When the switch handle 30 of the main switch 18 is in the OFF position, the utility power supplied to input terminals 70 and 72 is removed from the first and second hot lead terminal bars 64 and 66, respectively. Similarly, the switch handle 56 of the generator switch 21 is movable between a first position, ON, and a second position, OFF, to selectively connect the hot leads from the secondary power source to the first and the second hot lead terminal bars 64 and 66, respectively. The interlock assembly 24 operates in cooperation with the main switch 18 and the generator switch 21 to prevent both from being in the first or ON position at the same time. Movement of the first interlock 26 of the interlock assembly 24 prevents switch handle 30 from being moved to an ON position and allows switch handle 42 of the generator neutral switch 20 to be moved to an ON position, which also results in movement of switch handle 44 of the utility neutral switch 22 to an OFF position. Translation of the second interlock 28 relative to interlock assembly 24 allows switch handle 56 of the generator switch 21 to be moved to an ON position. In this manner, the generator switch 21 is connected to hot terminal bars 64 and 66 and the generator neutral switch 20 is connected to neutral bars 60 and 62 via neutral connector plate 68. The sequential operation of the first and second interlock, 26 and 28 respectively, further provides a proper switching sequence for transferring the hot leads and the neutral lead of each power supply.

The load center 10 further includes multiple connectors 80, 82, 84 and an electrical conductor 86. A first connector 80 is configured to be mounted to the input of the utility neutral switch 22. According to the illustrated embodiment, the first connector 80 includes a pair of prongs insertable into the terminals of the utility neutral switch 22. A connecting block includes an opening of sufficient size to receive a conductor for the utility power input. Because the conductors for each of the power inputs must be rated to conduct a higher magnitude of current than the conductors to individual loads, the size (i.e. diameter) of the conductor for the power inputs must be greater than for the conductors to individual loads. A clamping member, such as a screw, engages the connecting block to secure the conductor for the neutral lead, N, from the power supply within the opening of the first connector 80. A second connector 82 is mounted to the ground bar 76. The second connector 82 is secured to the ground bar 76 by any suitable method including, but not limited to, a prong inserted into an opening in the ground bar 76 or by a threaded member insertable into one of the openings 77 on the ground bar 76. The second connector 82, similar to the first connector 80, includes a connecting block with an opening of sufficient size to receive a conductor for the utility power input and a clamping member to secure the conductor for the neutral lead, N, from the power supply within the opening of the second connector 82. A third connector 84 is also secured to the ground bar 76 and is constructed similarly to the first and second connectors, 80 and 82 respectively. A conductor 86 is provided of sufficient length to span the distance between the first connector 80 and the third connector 84 and of sufficient size to handle the rating of the utility power source and to be secured within the openings of the first and third connectors, 80 and 84 respectively.

In operation, the electrical panel 11 is configured as a service entrance panel or a subpanel according to the connections of the neutral lead, N, of the utility supply and the conductor 86 to the electrical panel 11. As illustrated in FIG. 2, the electrical panel 11 is configured as a service entrance panel. The neutral lead, N, of the utility supply is connected to the second connector 82, and the conductor 86 is connected between the first connector 80 and the third connector 84. The conductor 86 establishes a single connection between the neutral bus bar 62 and the electrical ground via the ground bar 76. As illustrated in FIG. 3, the electrical panel 11 is configured as a subpanel. The neutral lead, N, of the utility supply is connected to the first connector 80, and the conductor 86 is removed from the electrical panel 11. Removal of the conductor 86 isolates the ground bar 76 from the neutral bar 62, limiting the connections between neutral and ground to a single electrical connection established in the service entrance panel. Thus, a single electrical panel 11 may be provided that is configurable to be installed either as a service entrance panel or as a subpanel. Further, the presence or absence of the conductor 86 provides a visual indication to an installer of the how the electrical panel 11 is configured.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. An electrical load center configured to distribute power from multiple power sources to a plurality of electrical loads, each power source having a neutral conductor, the electrical load center comprising:
   a neutral terminal bar having a plurality of terminals and configured to alternately provide a neutral connection from each power source to the plurality of electrical loads;
   a ground terminal bar having a plurality of terminals and configured to be connected to an electrical ground;
   a transfer switch assembly, including:
      a first input configured to receive the neutral connection from a first power source,
      a second input configured to receive the neutral connection from a second power source, and
      an output electrically connected to the neutral terminal bar,
      wherein in a first position, the transfer switch assembly is operable to connect the first input to the output and to disconnect the second input from the output, and
      wherein in a second position, the transfer switch assembly is operable to connect the second input to the output and to disconnect the first input from the output;
   a first connector mounted to the first input of the transfer switch assembly, wherein the first connector is connected to the neutral conductor for the first power source in a first operating configuration and disconnected from the neutral conductor for the first power source in a second operating configuration;
   a second connector mounted to the ground terminal bar, wherein the second connector is disconnected from the neutral conductor for the first power source in the first operating configuration and connected to the neutral conductor for the first power source in the second operating configuration;

a third connector mounted to the ground terminal bar; and an electrical conductor disconnected from the first connector and the third connector in the first operating configuration and connected between the first connector and the third connector in the second operating configuration.

2. The electrical load center of claim 1 wherein each of the first, second and third connectors is a terminal block having an opening, wherein the opening of the first connector is configured to alternately receive the neutral conductor and the electrical conductor, and a first clamping member to alternately secure the neutral conductor and the electrical conductor within the opening, wherein the opening of the second connector is configured to receive the neutral conductor and a second clamping member to secure the neutral conductor within the opening, and wherein the opening of the third connector is configured to receive the electrical conductor and a third clamping member to secure the electrical conductor within the opening.

3. An electrical distribution panel configured to mount within an enclosure and configured to distribute power from multiple power sources to a plurality of electrical loads, each of the multiple power sources having a neutral conductor, the electrical distributing panel comprising:

a neutral terminal bar mounted to the electrical distribution panel;

a ground terminal bar mounted within the enclosure and configured to receive a ground conductor connected to an electrical ground;

a transfer switch, including:
 a first input configured to receive a first neutral connection using the neutral conductor from a first power source,
 a second input configured to receive a second neutral connection using the neutral conductor from a second power source, and
 an output selectively connected to one of the first input and the second input; and a means for selectively configuring the electrical distribution panel as one of a service entrance panel or a subpanel, wherein the service entrance panel is configured for alternately electrically connecting the first neutral connection or the second neutral connection to the ground terminal bar, and wherein the subpanel is configured for electrically isolating the first neutral connection and the second neutral connection from the ground terminal bar.

4. A method of configuring an electrical load center as a subpanel in a first operating configuration and a service entrance panel in a second operating configuration, wherein the electrical load center includes a transfer switch configured to distribute power from a first power source and a second power source to a plurality of electrical loads, each power source having a neutral conductor to provide a neutral connection, the method comprising the steps of:

connecting the neutral conductor for the first power source to a first connector in the first operating configuration, wherein the first connector is mounted to a first input of the transfer switch;

disconnecting the neutral conductor for the first power source from a second connector in the first operating configuration, wherein the second connector is mounted to a ground terminal bar, the ground terminal bar having a plurality of terminals and being configured to be connected to an electrical ground;

disconnecting the neutral conductor for the first power source from the first connector in the second operating configuration;

connecting the neutral conductor for the first power source to the second connector in the second operating configuration;

disconnecting the electrical conductor between the first connector and a third connector in the first operating configuration, wherein the third connector is mounted to the ground terminal bar; and connecting the electrical conductor between the first connector and a third connector in the second operating configuration, wherein the subpanel in the first operating configuration is configured to isolate the neutral connection from the ground terminal bar, and wherein the service entrance panel in the second operating configuration is configured to electrically connect the neutral connection of either of the first and second power sources to the ground terminal bar.

\* \* \* \* \*